United States Patent
Rist

(10) Patent No.: US 10,582,048 B2
(45) Date of Patent: *Mar. 3, 2020

(54) TELECOMMUNICATION SYSTEM AND METHOD FOR FLEXIBLE CONTROL OF THE TELECOMMUNICATION SYSTEM USING A SWITCHING COMMAND ISSUED BY AN APPLICATION TO A PLATFORM

(71) Applicant: Unify GmbH & Co. KG, Munich (DE)

(72) Inventor: Claus Rist, Bochum (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,828

(22) Filed: Aug. 19, 2019

(65) Prior Publication Data

US 2019/0373108 A1 Dec. 5, 2019

Related U.S. Application Data

(63) Continuation of application No. 16/249,955, filed on Jan. 17, 2019, now Pat. No. 10,432,787, which is a
(Continued)

(30) Foreign Application Priority Data

Dec. 19, 2014 (DE) .......... 10 2014 019 240

(51) Int. Cl.
*H04M 3/42* (2006.01)
*H04M 3/24* (2006.01)
(Continued)

(52) U.S. Cl.
CPC ....... *H04M 3/42323* (2013.01); *H04M 3/241* (2013.01); *H04M 3/5183* (2013.01); *H04M 3/546* (2013.01); *H04M 7/0021* (2013.01)

(58) Field of Classification Search
CPC .................... H04M 3/42323; H04M 3/241
(Continued)

(56) References Cited

U.S. PATENT DOCUMENTS

| | | | |
|---|---|---|---|
| 6,181,691 B1 | 1/2001 | Markgraf et al. | |
| 7,561,673 B2 * | 7/2009 | Wang .................. | G06F 8/00 |
| | | | 379/88.01 |

(Continued)

FOREIGN PATENT DOCUMENTS

| | | |
|---|---|---|
| CN | 1345632 A | 4/2002 |
| CN | 1364043 A | 8/2002 |

OTHER PUBLICATIONS

ECMA International: "Standard ECMA-269: Services for Computer Supported Telecommunications, Applications (CSTA) Phase III", 9th Edition, Dec. 2011, pp. 1-816.
(Continued)

*Primary Examiner* — William J Deane, Jr.
(74) *Attorney, Agent, or Firm* — Buchanan Ingersoll & Rooney PC

(57) ABSTRACT

A telecommunication system is configurable so that there can be flexible control of a switching command issued by an application to a platform where the switching command is executable in (a) a first execution mode in which the switching command is executed simultaneous with switching and verified or (b) a second execution mode in which the switching command is executed immediately and without verification. The application can be run to cause the switching command to be sent to the platform and the platform can execute the switching command received from the application. At least one of resting on a case-by-case basis and
(Continued)

deciding which execution mode should be utilized for execution of the switching command can also occur before the sending of the switching command and/or before the executing of the switching command.

20 Claims, 5 Drawing Sheets

Related U.S. Application Data continuation of application No. 15/783,274, filed on Oct. 13, 2017, now Pat. No. 10,225,398, which is a continuation of application No. 14/963,702, filed on Dec. 9, 2015, now Pat. No. 9,819,795.

(51) Int. Cl.
*H04M 7/00* (2006.01)
*H04M 3/51* (2006.01)
*H04M 3/54* (2006.01)

(58) Field of Classification Search
USPC ..... 379/211.01, 211.02, 207.04, 219, 212.01
See application file for complete search history.

(56) References Cited

U.S. PATENT DOCUMENTS

| | | | |
|---|---|---|---|
| 7,565,357 B2* | 7/2009 | Rao | H04L 67/2823 |
| 7,809,663 B1* | 10/2010 | Birch | G06N 20/00 |
| | | | 706/45 |
| 8,266,586 B2* | 9/2012 | Wang | G06Q 10/10 |
| | | | 717/104 |
| 8,396,973 B2* | 3/2013 | Wang | H04L 29/06027 |
| | | | 709/204 |
| 8,452,668 B1 | 5/2013 | Peterson | |
| 9,858,044 B2* | 1/2018 | Chouinard | G06F 21/10 |
| 2002/0072356 A1 | 6/2002 | Yamashita et al. | |
| 2002/0181687 A1 | 12/2002 | Aberer et al. | |
| 2006/0070081 A1 | 3/2006 | Wang | |

OTHER PUBLICATIONS

"A Pattern Language for Service-based Platform Integration and Adaption" Ioanna Lytra, Stefan Sobernig, Huy Trane, Uwe Zdum; Faculty of Computer Science, University of Vienna, Austria, Institute for IS and New Media, WU Vienna, Austria; http://www.mobicents.org, http://www.aws.amazon.com/s3, https://www.developers.facebook.com, http://www.android.com, http://www.apple.com/ios.

* cited by examiner

TELECOMMUNICATION SYSTEM AND METHOD FOR FLEXIBLE CONTROL OF THE TELECOMMUNICATION SYSTEM USING A SWITCHING COMMAND ISSUED BY AN APPLICATION TO A PLATFORM

CROSS-REFERENCE TO RELATED APPLICATIONS

This application is a continuation application of U.S. patent application Ser. No. 16/249,955, which is a continuation of U.S. patent application Ser. No. 15/783,274, which is a continuation application of U.S. patent application Ser. No. 14/963,702, which claims priority to German Patent Application No. 10 2014 019 240.7, which was filed on Dec. 19, 2014. The entirety of this application is incorporated by reference herein.

FIELD OF INVENTION

This invention includes a method for flexible control of a telecommunication system using a switching command issued by an application to a platform, a computer program product for implementing the method that is executable by a communication device, a non-transitory machine-readable data carrier with the computer program product stored on it, and a telecommunication apparatus for flexible operation of a switching command issued by an application.

BACKGROUND OF THE INVENTION

Background on the following terms is provided herein for the reader's ease of reference when reading the following description:
  a platform is a communication platform, such as a switching center or telecommunications installation (which can also be called a Private Branch Exchange or a "PBX");
  an application is, for example, a computer program stored in non-transitory memory that is run or processable by at least one processor of an electronic device such as a terminal (e.g., first-party computer telephone integration ("CTI") or individual workstation) and can be used to establish or manage a telephone connection, e.g., call, or data connection, or a call center (third-party CTI or network solution used to distribute calls to agents; and
  a switching command in switching technology is, for example: a call request, call acceptance, call termination, call forwarding, call transfer. Switching commands also include controlling a display, switching various features on and off, selecting agents, and handling announcements (e.g., in a call center).

According to the industry standard European Computer Manufacturer's Association 269 ("ECMA-269"), a platform (also called a "switching function") with Computer Supported Telecommunications Applications ("CSTA"), which is a protocol specification used for data transfer between a telephone installation and computer programs, is able to execute a switching command (also called "service") for an application (also called a computing function) in one of the following two ways (or modes):
  (a) "atomic," simultaneous with switching, which involves verified execution of the switching command or service, and
  (b) "fire and forget" or "multi-step," which involves unverified execution of the switching command.

This is set forth in ECMA-269 clause 9.2.1. The current form of implementation is static—i.e., cannot be changed—and is established by the manufacturer for the platform (switching function); it can be determined or queried by the application (computing function) using announcement procedures within the CSTA protocol, which then establishes the mode in which all incoming switching commands are executed by the respective platform. This gives platforms the choice between implementing a switching command using the above noted method (a) or method (b). The application can ascertain which method to use for which switching command.

In the case of automatic call distribution by an application to an agent, the proven method for small and medium-sized businesses corresponds to the first execution mode, "simultaneous with switching," which involves verified execution of this service with the related longer service run time. However, manual call distribution to another subscriber using a switchboard calls for the second execution mode, "fire and forget," which involves a shorter service run time. This creates a conflict for the user, because the switchboard cannot distribute his calls without verification, and this can easily cause a time delay if a call center application distributes the calls to agents with verification at the same time.

This creates the problem that the system is not flexible enough, because the platform's manufacturer has preset the method and so the application must follow certain procedures based on this manufacturer preset configuration.

SUMMARY OF THE INVENTION

An objective of the present invention is to relax the rigid specifications of the standard and allow more flexible handling of switching command processing. This objective can be achieved with embodiments of the method, computer program product that when executed by a communication device, causes the communication device to implement this method, non-transitory machine-readable data carrier having a computer program product stored on it, and/or a telecommunication apparatus (e.g. an installation, arrangement, network or communication system).

A switching command that can be processed using embodiments of the invented method can be executed as follows:
  a) in a first execution mode, in which the switching command is executed simultaneous with switching and verified, and
  b) in a second execution mode, in which the switching command is executed immediately and without verification.

Embodiments of the method can be implemented so that, according to a first variation, the application causes a device running the application to perform tests in all cases before sending the switching command to the platform and decides which execution mode should be used to execute that switching command, and sends the appropriately designated switching command, or a switching command that includes a control parameter, to the platform, which then executes the switching command as appropriate. According to a second variation, the platform tests and decides on a case-by-case basis, before carrying out the switching command, which execution mode it will use to execute that switching command. If, according to a third variation, both the application and the platform are to test for a switching command on a case-by-case basis and decide which execution mode should be used to execute that switching command, then preferred priority for testing and deciding is given to the respective implementation. According to some embodiments of the method, communication here involves synchronization of the application and the platform. It is therefore possible for the manufacturer to use synchronization to tell the platform how a potential collision might be resolved.

Embodiments of the method can permit very flexible handling of even the most widely varied switching commands, because their processing is not bound to a certain execution mode, but rather can be performed by the application in the first execution mode or in the second execution mode or alternatively can be executed in a suitable manner by the platform.

According to a preferred embodiment of the invented method, the application first acts in such a way that it gives the switching command a first control parameter that designates the execution mode with which the switching command should be processed.

According to another preferred embodiment of the invented method, the application gives the switching command a second control parameter that allows for error handling if the switching command cannot be executed and establishes the status that the platform should assume in that case. For the example of call forwarding, also called deflect call, the platform can then assume the following statuses:

return to the original call status (also called initial or default call state),
forwarding to a switchboard, also called intercept,
another call (recall),
displaying a busy status and no further action (also called fail),
switching into an ongoing conversation (also called override),
call waiting (queue),
call forwarding, also called CFNR (Call Forwarding on No Reply).

The preceding list is, of course, not exclusive and can include other possibilities.

It can be advantageous for the platform to notify the application at start-up regarding whether it allows or facilitates flexible execution of switching commands as described above. This is especially desirable if both platforms capable of flexible switching command execution and platforms without this capability are available in the same telecommunication system. This tells the application which switching commands it appropriately can or should issue. If the platform does not support the new parameters, then a request from the application would be ignored. In other words, the platform must have the method implemented.

By introducing the aforementioned parameters, the various previously described requests for a system reaction can be established by means of a configuration and/or by the user himself, either statically or dynamically, using a graphic user interface, for example. This results in new more flexible realization concepts, by means of which in the preceding example a switchboard can distribute its calls without delays and the call center can transfer calls to agents as usual but with verification.

According to one alternative embodiment, the platform tests the properties of a terminal connected to the telecommunication system and executes the switching command based on these properties. These terminal properties are, for example, "switchboard," "agent," or "call center queue." Alternatively or additionally, the platform can test and take into consideration the overall configuration of the telecommunication system. This could include, for example, having a switchboard included in the platform, subscribers logged in as agents, a call center queue included, etc. Alternatively or additionally, the platform can also test additional properties of the switching command and consider them in processing the switching command. In other words, in this embodiment, certain parameters are not assigned, as is the case for previously described embodiments, but rather are queried or derived from determined configuration details of the terminals involved.

Embodiments of a telecommunication installation or other type of telecommunications apparatus for flexible execution of a switching command issued by an application can include the following components: a terminal on which an application is running that can issue switching commands, a platform for executing the switching commands, and a control device for implementing the method as previously described.

A computer program product for executing the invented method, and a non-transitory machine-readable data carrier (e.g. non-transitory memory) on which such a computer program product or computer program is stored, can also be embodiments of the invention.

Other details, objects, and advantages of the invention will become apparent as the following description of certain exemplary embodiments thereof and certain exemplary methods of practicing the same proceeds.

BRIEF DESCRIPTION OF THE DRAWINGS

Additional advantages, features, and characteristics of the present invention are presented in the following description of advantageous embodiments with reference to the drawing. It should be appreciated that like reference numbers used in the drawings may identify like components. The figures show schematically.

DETAILED DESCRIPTION OF EXEMPLARY EMBODIMENTS

Figure 1:
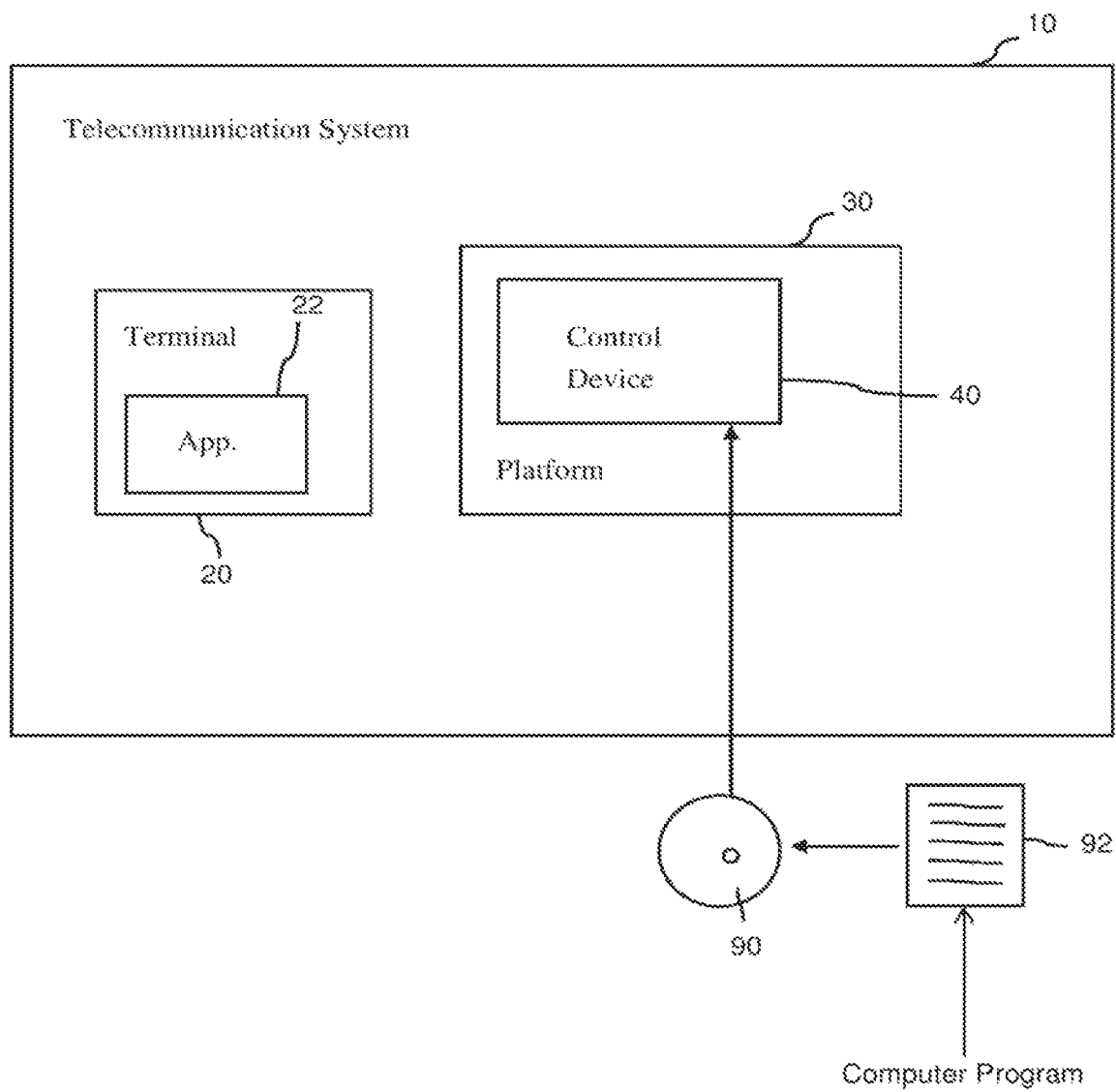
FIG. 1 is a block diagram of an exemplary embodiment of a telecommunication apparatus (e.g. a telecommunications installation or arrangement)

Referring to FIG. 1, a telecommunication system 10, which includes a platform 30 that contains a control device 40. The telecommunication system 10 also contains a terminal 20 on which an application (also referred to as an "app." or "App.") 22, shown only schematically, is running. The terminal 20 is connected to the platform 30 through a data line. A CD-ROM is shown schematically as the non-transitory machine readable data carrier on which a computer program 92, also shown schematically, is stored. The machine-readable data carrier 90 as well as the computer program 92 stored on it is intended for use in the control device 40, instead of a CD-ROM, other types of non-transitory computer readable medium may be used, such as flash memory, a hard drive as the non-transitory machine readable data carrier 90. The memory may be internal to the platform 30 or control device 40 or may be stored external to that device and be communicatively connected to the device for facilitating the running of the computer program 92 stored on the memory.

Figure 2:
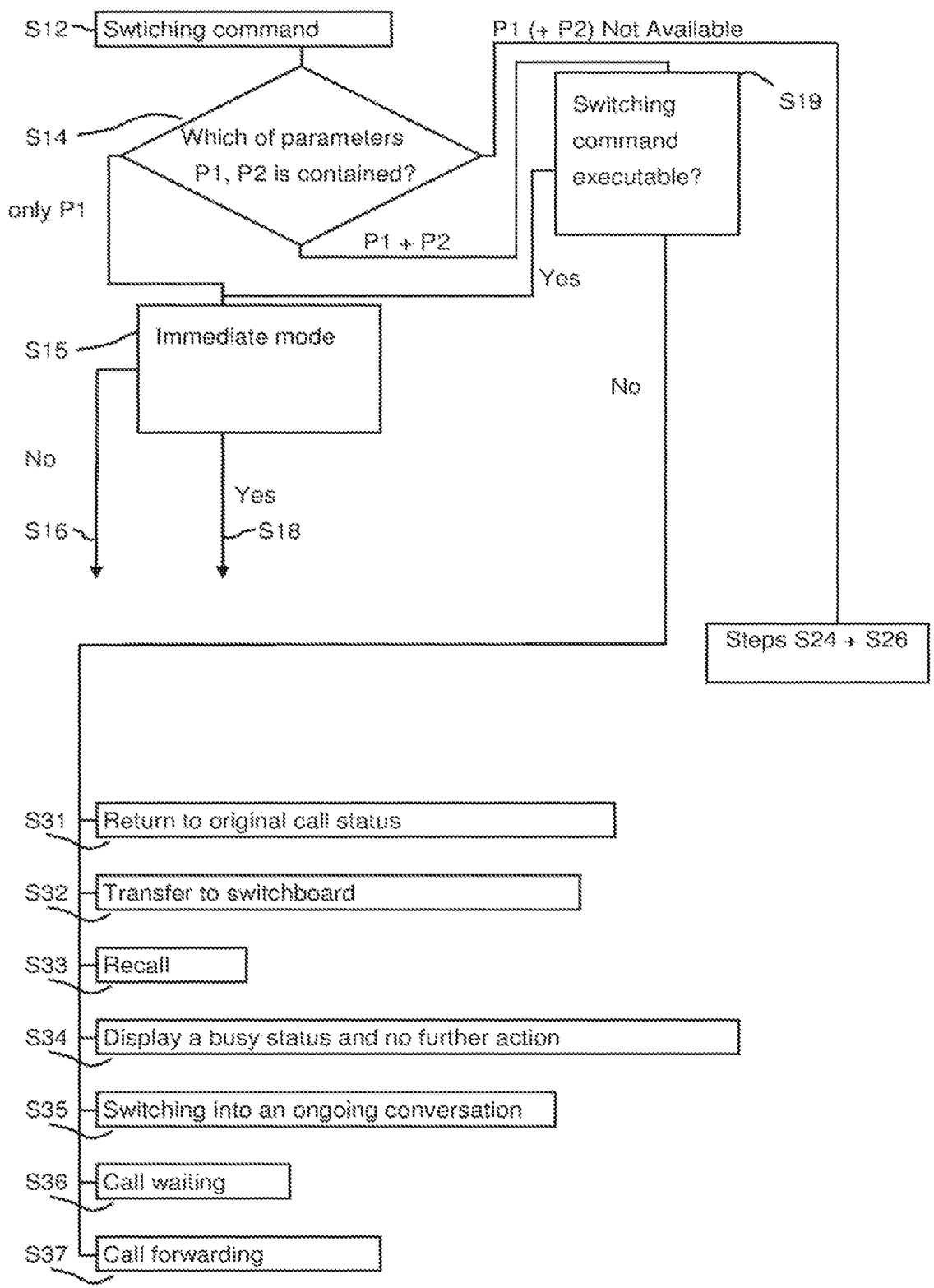
FIG. 2 is a flow chart illustrating an exemplary embodiment of the invented method.

FIG. 2 shows a first embodiment of the invented method. In a step S12, an application 22 sends a switching command to the platform 30. In a step S14, the platform 30 tests to see which control parameters are contained in the switching command so that the platform 30 tests to see which of the parameters P1 and P2 are contained in the switching command. If only the parameter P1 is contained in the switching command, the execution mode is determined in a step S15. The switching command is then executed according to the selected mode in a step S16 in the first execution mode, simultaneous with switching and verified (also called atomic), or, if the second execution mode is specified in the parameter P1, the switching command is executed immediately and without verification, which is also called fire and forget or multi-step, in a step S18.

If it is determined in step S14 that both the parameter P1 and the parameter P2 are contained in the switching command, a step S19 tests to see whether the switching command is executable. If the switching command is executable, depending on the content of the parameter P1, then tested execution of the switching command according to step S16 or untested execution of the switching command according to step S18 occurs. If the switching command is not executable, the system the value of parameter P2, and depending upon the value of parameter P2, the appropriate one of the following steps is taken for the purpose of error management:

S31: returning to the original call status (also called initial or default call state),
S32: forwarding to a switchboard, also called intercept,
S33: placing the call again (recall),
S34: displaying a busy status and no further action (also called fail),
S35: switching into an ongoing conversation (also called override),
S36: call waiting (queue), or
S37: call forwarding, also called Call Forwarding on No Reply ("CFNR").

Figure 3:
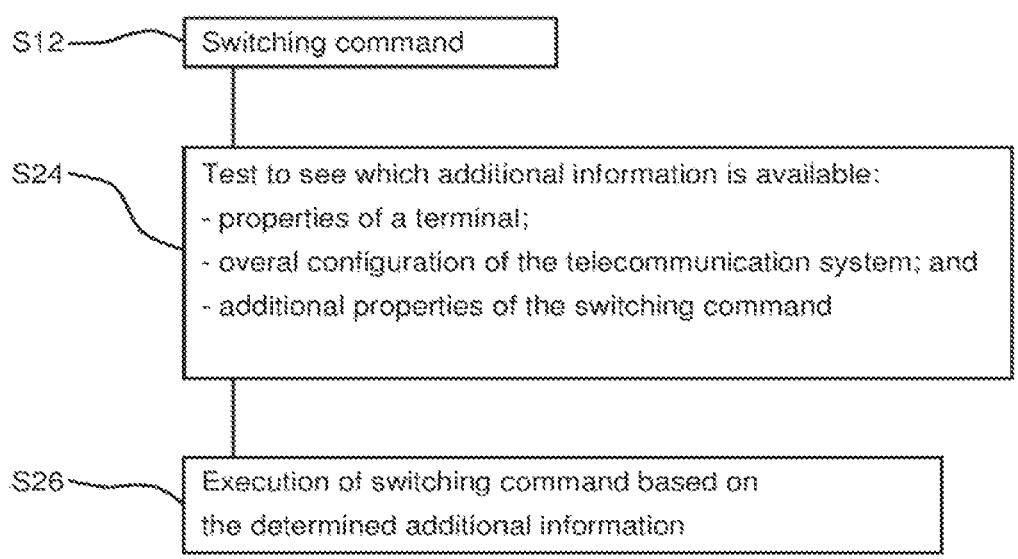
FIG. 3 is a flow chart illustrating exemplary steps of a method for an embodiment of the invented method.

According to an alternative second embodiment of the invented method shown in FIG. 3, in a step S12 the application 22 sends a switching command to the platform 30. Once the platform 30 in step S14 has determined that no control parameters (specifically, at least P1) are contained in the switching command, the platform 30 tests to see what additional information is available in the switching command in step S24. The additional pieced of information include: (i) the properties of a terminal 20 connected to the telecommunication system 10, (ii) the overall configuration of the telecommunication system 10, and (iii) additional properties of the switching command. The preceding list can also contain other types of additional information. Depending upon which of the following pieces of additional information are available in the switching command, the method is executed accordingly in step S26.

Figure 4:
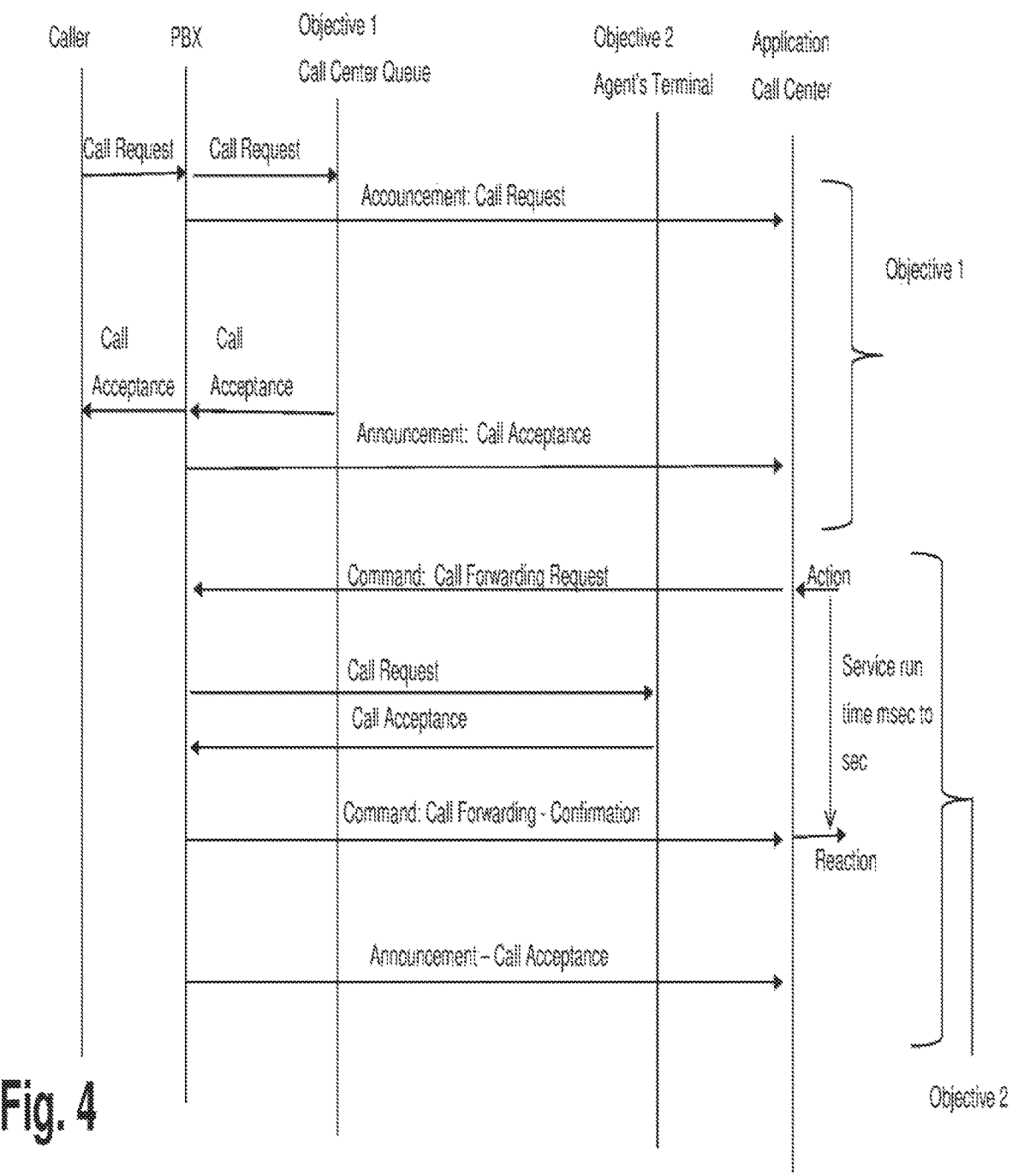
FIG. 4 is schematic illustration of an exemplary flow of communications that may occur during an implementation of the first execution mode when performing an embodiment of the method or that may be utilized in an embodiment of the telecommunication apparatus.

FIG. 4 illustrates an exemplary communications flow for a first execution mode "simultaneous with switching—atomic" that may be utilized in embodiments of the telecommunication apparatus and method. A call request from a caller was accepted by the queue of a call center (Objective 1) on the platform 30. As a result, a call center application 22 acts and requests that the call be forwarded to an agent (Objective 2). This request first causes a call request through the platform 30. If the agent's terminal 20 sends back a response to the platform 30 indicating successful acceptance of the call, execution of the action is confirmed by the application 22. The time interval between action and reaction is also called the service run time and lasts up to a few seconds, depending on the circumstances. During the service run time, additional switching commands from the call center application 22 are blocked for this queue, but at the same time the system can also ensure that the action is completed with no switching errors.

Figure 5:
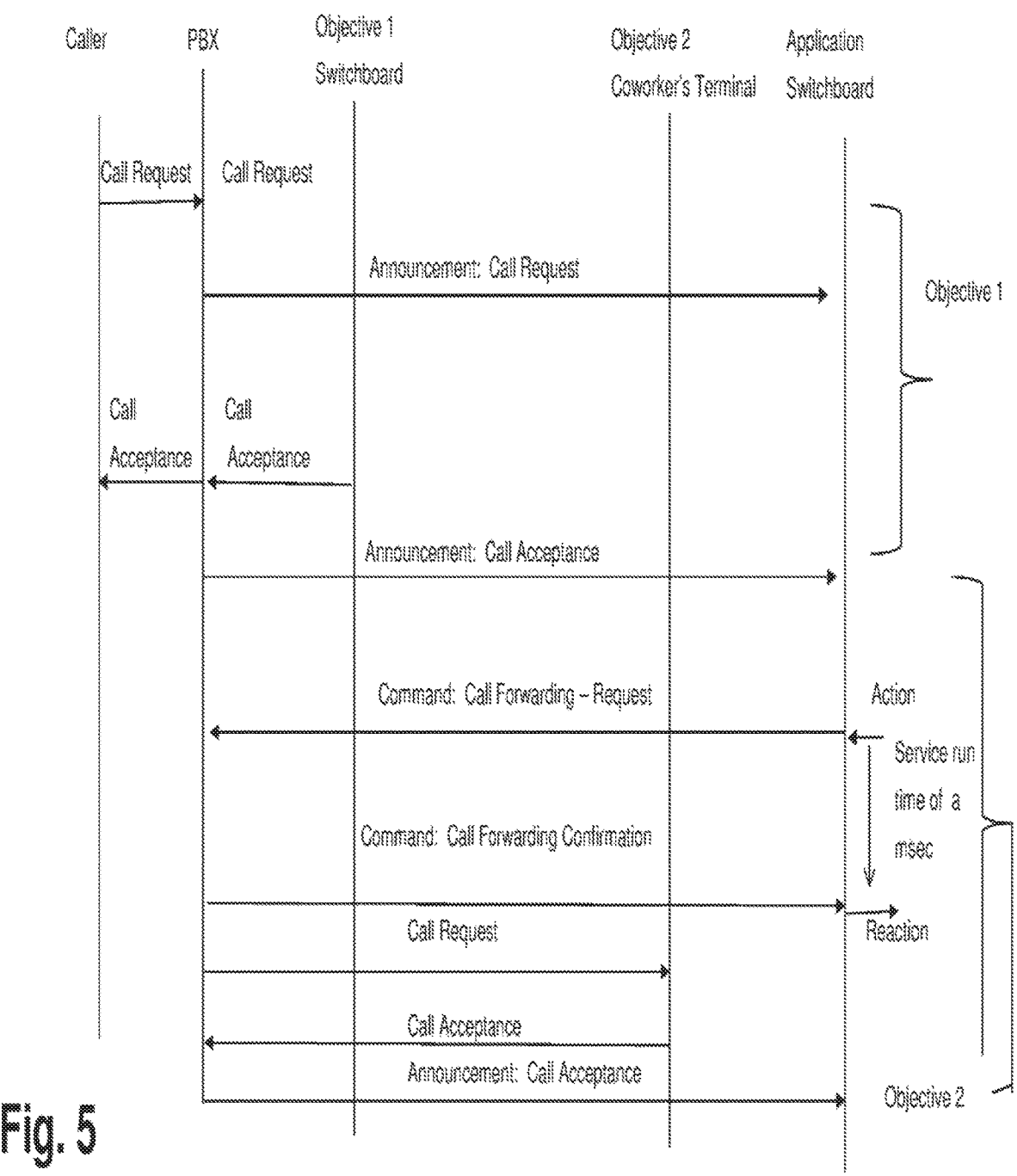
FIG. 5 is a schematic illustration of an exemplary flow of communications that may occur during an implementation of the second execution mode when performing an embodiment of the method or that may be utilized in an embodiment of the telecommunication apparatus.

FIG. 5 illustrates an exemplary communications flow for a second execution mode "unverified switching—multi-step" that may be utilized in embodiments of the telecommunication apparatus and method. A call request from a caller was accepted by a switchboard (Objective 1) on the platform 30. On the switchboard the user selects one of the caller's coworkers, causing the switchboard application 22 to forward the call to the coworker's terminal 20 (Objective 2). This request requires immediate confirmation of the execution of the action provided to the application 22, with a corresponding service run time in the millisecond range. Only after that is a call request generated through the platform 30. Then the coworker's terminal 20 can send a successful call acceptance response back to the platform 30. Due to the short service run time, the switchboard is free for additional switching commands, but the system does not ensure that the preceding action was completed with no switching errors.

If the embodiment of the invented method provides for processing of the switching command but the parameter P1 is not available, an incoming switching command from an application 22 can be executed by a feature of the terminal 20 made available through the platform 30 by the configuration of the platform 30 itself or by the overall configuration of the telecommunication system 10.

It should be noted that the features of the invention described by referencing the presented embodiments, for example the type and configuration of individual announcements and parameters, can also be present in other embodiments, unless stated otherwise or prohibited for technical reasons. Not all features of individual embodiments described in combination must necessarily always be implemented in any one particular embodiment. Therefore, while certain exemplary embodiments of a communication system and communication apparatus and methods of making and using the same have been discussed and illustrated herein, it is to be distinctly understood that the invention is not limited thereto but may be otherwise variously embodied and practiced within the scope of the following claims.

LIST OF REFERENCE INDICATORS

10—Telecommunication system;
20—Terminal;
22—Application;
30—Platform;
40—Control device;
90—non-transitory machine-readable data carrier:
92—Computer program;
S12-S37—Steps: and
P1-P2—Parameters

What is claimed is:
1. A telecommunication apparatus for flexible execution of a switching command, comprising:
a computer device that is configured to execute switching commands received from a terminal, the computer device comprising a non-transitory computer readable medium communicatively connected to at least one processor;

the computer device configured to execute the switching commands received from the terminal via an application being run on the terminal; and the computer device configured to test the switching commands to decide whether a first execution mode or a second execution mode should be utilized for execution of the switching command before the executing of the switching command; and wherein the first execution mode is a mode in which the switching command is executed with switching and verification and the second execution mode is a mode in which the switching command is executed immediately and without verification.

2. The telecommunication apparatus of claim 1, wherein testing of the switching commands and deciding whether the first execution mode or the second execution mode should be utilized for execution of each switching command before execution of the switching command is performed such that each and every one of the switching commands is tested to determine whether the first execution mode or the second execution mode should be used for execution of the switching command.

3. The telecommunication apparatus of claim 1, wherein the switching commands comprise call forwarding.

4. The telecommunication apparatus of claim 1, wherein testing of the switching commands is performed to determine an overall configuration of the telecommunication system by the platform; and wherein the computer device performs the executing of the switching command based on the overall configuration determined from the testing of the overall configuration.

5. The telecommunication apparatus of claim 1, wherein testing of the switching commands is performed to determine additional properties of each switching command, the additional properties comprising at least one of:

(i) a first control parameter indicating the first execution mode is to be utilized;

(ii) a second control parameter indicating the second execution mode is to be utilized;

(iii) properties of a terminal connected to a telecommunication system; and (iv) a configuration of the telecommunication system; and wherein the computer device is configured to execute each switching command based on the additional properties of the switching command determined from the testing of the additional properties.

6. The telecommunication apparatus of claim 1, wherein the computer device is configured to synchronize with the application running on the terminal to determine how to avoid potential collisions that are resultable from execution of the switching commands.

7. A method for control of a telecommunication system, comprising:

a computer device deciding whether a first execution mode in which the switching command is executed simultaneous with switching and verification should be utilized for execution of the switching command or a second execution mode in which the switching command is executed immediately and without verification occurs should be utilized for execution of the switching command before sending of the switching command and/or executing of the switching command;

wherein the computer device comprises a non-transitory computer readable medium communicatively connected to at least one processor.

8. The method of claim 7, comprising:

the computer device providing the switching command with a first control parameter that designates the first execution mode to be used or the second execution mode to be used.

9. The method of claim 8, wherein the computer device is a terminal device running an application, the method also comprising:

the terminal device running an application providing the switching command with a second control parameter which enables error management and establishes a status that a platform of the telecommunication system should assume upon the platform being unable to execute the switching command in accordance with the execution mode identified via the first control parameter, the status being at least one of:

return to original call status;

forwarding to a switchboard;

recall;

display a busy status and no further action;

switching into an ongoing conversation;

call waiting; and call forwarding.

10. The method of claim 7, comprising:

testing to see whether a platform allows flexible handling of a switching command upon a starting up of an application to be run by the computer device.

11. The method of claim 7, wherein the computer device is a platform and wherein additional information comprising properties of a device connected to the telecommunication system is available to the platform, and wherein the platform performs the testing of the switching command to decide whether the first execution mode or the second execution mode should be utilized for execution of the switching command before the executing of the switching command such that the platform:

tests the properties of a terminal device connected to the telecommunication system; and the platform performs the executing of the switching command based on a determination of the properties of the terminal device obtained from the testing of the properties of the terminal device connected to the telecommunication system.

12. The method of claim 11, wherein the additional information comprises at least one of (i) properties of a terminal device connected to the telecommunication system and (ii) a configuration of the telecommunication system.

13. The method of claim 11, comprising:

testing an overall configuration of the telecommunication system by the platform; and wherein the platform performs the executing of the switching command based on the overall configuration determined from the testing of the overall configuration.

14. The method of claim 7, wherein the computer device is a platform and the platform performs testing of the switching command to determine what additional information is available in the switching command and deciding which execution mode of the first and second execution modes should be utilized based on the additional information determined from this testing before the executing of the switching command is performed.

15. The method of claim 7, wherein the computer device tests the switching command on and decides whether a first execution mode in which the switching command is executed simultaneous with switching and verification should be utilized for execution of the switching command or a second execution mode in which the switching command is executed immediately and without verification occurs should be utilized for execution of the switching command before sending of the switching command.

16. The method of claim 7, wherein the computer device tests the switching command on a case-by-case basis and decides whether a first execution mode in which the switching command is executed simultaneous with switching and verification should be utilized for execution of the switching command or a second execution mode in which the switching command is executed immediately and without verification occurs should be utilized for execution of the switching command before execution of the switching command.

17. A non-transitory machine readable medium having a program stored thereon, the program defining a method that is performed by a computer device when the computer device executes the program, the method comprising:
 testing a switching command and deciding whether a first execution mode in which the switching command is executed with switching and verification should be utilized for execution of the switching command or a second execution mode in which the switching command is executed immediately and without verification occurs should be utilized for execution of the switching command before at least one of: sending of the switching command and executing of the switching command.

18. The non-transitory machine readable medium of claim 17, wherein the testing of the switching command is performed to determine additional information of the switching command, the additional information comprising at least one of:
 (i) a first control parameter indicating the first execution mode is to be utilized;
 (ii) a second control parameter indicating the second execution mode is to be utilized;
 (iii) properties of a terminal connected to a telecommunication system of the computer device; and
 (iv) a configuration of the telecommunication system.

19. The non-transitory machine readable medium of claim 17, wherein the switching command is call forwarding.

20. The non-transitory machine readable medium of claim 17, wherein the testing of the switching command and deciding which execution mode should be utilized for execution of the switching command before the sending of the switching command or before the executing of the switching command is performed such that each and every switching command is tested to determine whether the first execution mode or the second execution mode should be used for execution of the switching command.

* * * * *